United States Patent [19]

Davis et al.

[11] 4,422,302  
[45] Dec. 27, 1983

[54] PROCESS FOR COOLING AND FLUIDIZING

[75] Inventors: Robert B. Davis, Nyack; Mark A. Delano, White Plains, both of N.Y.

[73] Assignee: Union Carbide Corporation, Danbury, Conn.

[21] Appl. No.: 404,762

[22] Filed: Aug. 3, 1982

[51] Int. Cl.³ ............................................. F25D 17/00
[52] U.S. Cl. ............................................. 62/57; 62/63
[58] Field of Search .................................... 62/57, 63

[56] References Cited

U.S. PATENT DOCUMENTS

| | | | |
|---|---|---|---|
| 2,640,333 | 6/1953 | Bailey | 62/57 |
| 3,440,831 | 4/1969 | Thompson | 62/63 |
| 3,670,520 | 6/1972 | Bonteil | 62/57 |
| 3,738,121 | 6/1973 | Swindell | 62/57 |
| 4,343,634 | 8/1982 | Davis | 62/57 |

Primary Examiner—Ronald C. Capossela  
Attorney, Agent, or Firm—Saul R. Bresch

[57] ABSTRACT

In a process for cooling and fluidizing a bed of particles by passing a cryogen through the bed, said bed being first cooled to a desired operating temperature, the improvement comprising:

(a) admixing a liquid cryogen and an inert gas, said gas being at ambient temperature, at a point external, but proximate, to the bed to provide a mixture of liquid cryogen and gas at a temperature sufficiently low to maintain the bed at about the desired operating temperature;

(b) introducing the mixture from step (a) into at least two heat transfer coils connected in parallel and located in the bed whereby the desired operating temperature is imparted to the bed, and the liquid cryogen in the mixture vaporizes; and (c) removing the mixture of vaporized liquid cryogen and gas formed in step (b) from the coils and introducing the mixture into the bed to fluidize the bed.

2 Claims, 1 Drawing Figure

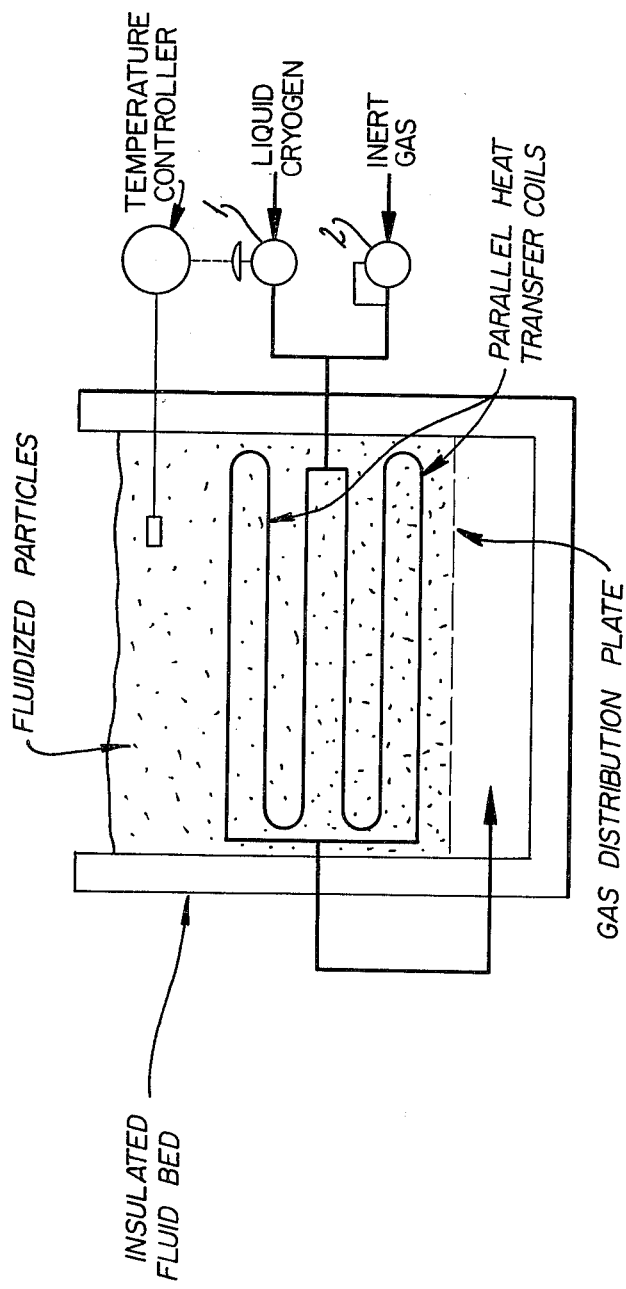

PROCESS FOR COOLING AND FLUIDIZING

TECHNICAL FIELD

This invention relates to a process for cooling and fluidizing a bed of particles to provide a fluidized bed for industrial applications.

BACKGROUND ART

Fluidized beds are used in a number of applications for the heating and cooling of materials. They exhibit good heat transfer characteristics and a uniform bed temperature profile, and have the capability of being quickly turned on or off, i.e., fluidized beds are capable of storing heat or refrigeration. They are usually designed to utilize heat exchange panels or coils when the heating or cooling load significantly exceeds the capability of the fluidizing gas flow to provide it.

A fluidized bed, in its simplest form, is a bed of particulate material supported on a distribution plate through which gas or liquid is forced at a velocity sufficient to cause the particles to separate and to act as a fluid. The primary physical characteristics affecting a fluidized bed are particle size and distribution, particle density, fluid viscosity, and fluid density. Further, the viscosity of fluidizing gases drops off rapidly with a reduction in temperature, which necessitates an increase in fluidizing flow.

A fluidized bed operating at a temperature of minus 150° F. can cool an object to minus 100° F. as rapidly as if it were directly immersed in a liquid nitrogen bath at minus 320° F., but with a thirty percent reduction in nitrogen consumption. An object may also be cooled at a slower, controlled rate by turning the bed "off" and "on". The concept of a cryogenic fluidized bed is, thus, very promising in applications such as roll cooling, degating, metallurgical treatment, shrink fitting, food freezing, cold trapping, and isothermal baths.

Various systems for fluidization and cooling are available. A first arrangement uses a separate fluid for cooling the bed by indirect heat transfer while a dry gas at ambient temperature is used for fluidization. For example, liquid argon or propane can be used to supply refrigeration while nitrogen gas is used for the fluidization. In a second arrangement, where temperature control is not critical, a fluidizing gas at about desired bed temperature is used first for cooling by indirect heat transfer and then for fluidization. In still another and third arrangement, a liquid cryogen, such as liquid nitrogen, is used for cooling through vaporization by indirect heat transfer and the vapor is used for fluidizing and additional cooling. This arrangement assumes that the refrigeration load will always be greater than the refrigeration generated by vaporizing the fluidizing gas, which is the situation in most cryogenic applications. A variation of this arrangement provides additional fluidizing gas when fluidization is required and additional refrigeration is not. The primary deficiency of these arrangements is that the low temperature cryogen is exhausted at temperatures lower than the desired bed temperature, which simply means that available refrigeration is being wasted. Other drawbacks are the need for external heat exchangers and heat leaks and delta T losses, and where a gaseous cryogen is used for cooling and fluidizing, mechanical refrigeration is generally required to assist in the cooling. Attempts to modify liquid or gaseous cryogen with an ambient gas, after they are used to cool the bed by indirect heat transfer, have not been successful because of slugging in the heat exchanger and fluctuations in temperature and pressure at the point at which the gas enters the plenum for introduction into the bed.

It is clear, then, that some other arrangement for cooling and fluidizing the bed is necessary if the liquid cryogen is to be used efficiently and/or mechanical refrigeration is to be avoided.

DISCLOSURE OF INVENTION

An object of this invention, therefore, is to provide an improvement in a process for cooling and fluidizing a bed of particles in which sufficient liquid cryogen is utilized to avoid the need for mechanical refrigeration, but in amounts substantially reduced from those known arrangements relying on liquid cryogen.

Other objects and advantages will become apparent hereinafter.

According to the present invention, an improvement has been discovered in a process for cooling and fluidizing a bed of particles by passing a cryogen through the bed, said bed being first cooled to a desired operating temperature.

The improvement comprises:

(a) admixing a liquid cryogen and an inert gas, said gas being at ambient temperature, at a point external, but proximate, to the bed to provide a mixture of liquid cryogen and gas at a temperature sufficiently low to maintain the bed at about the desired operating temperature;

(b) introducing the mixture from step (a) into at least two heat transfer coils connected in parallel and located in the bed whereby the desired operating temperature is imparted to the bed, and the liquid cryogen in the mixture vaporizes; and (c) removing the mixture of vaporized liquid cryogen and gas formed in step (b) from the coils and introducing the mixture into the bed to fluidize the bed.

BRIEF DESCRIPTION OF DRAWING

The sole FIGURE of the drawing is a side view in section of a fluidized bed in which subject process can be carried out. As noted, an insulated fluid bed is presented having fluidized particles resting on a perforated gas distribution plate. Parallel heat transfer coils are present in the bed with a line in which liquid cryogen and inert gas can be mixed feeding into the coils. A temperature controller regulates the flow of gases into the bed.

DETAILED DESCRIPTION

A fluidizing process and system adapted for cryogenic service may be found in patent application Ser. No. 246,916 filed Mar. 23, 1981, now U.S. Pat. No. 4,343,634, issued Aug. 10, 1982, incorporated by reference herein.

The temperature at which subject process can be carried out are in the range of ambient temperature to about minus 250° F. and are preferably in the range of about minus 80° F. to about minus 160° F. The cryogenic fluid most commonly used in fluidized beds is liquid nitrogen, but argon, helium, and carbon dioxide in liquid form can be used as well as many other gases, liquifiable at low temperatures, which are inert insofar as the apparatus, process materials and the medium to be fluidized are concerned.

The particles used in the bed can be alumina, sand, glass, ceramic powder, metals, salts, or any relatively fine material, which is inert to the other materials used in the process and will not break up to any appreciable extent. Particle size diameters are typically in the range of about 44 microns to about 177 microns.

The ambient gas, which is mixed with the liquid cryogen, is also inert insofar as the apparatus, process materials and medium to be fluidized are concerned. While nitrogen is the gas of choice, dry compressed air or other non-reactive dry gases can be used. Vaporized cryogen or recirculated fluidizing gas can also be used, of course.

A fluidized bed generally has two controlled conditions: bed temperature and fluidizing flow. While these conditions may be controlled manually, it is desirable, particularly in a cryogenic fluidized bed, to have bed temperature and fluidizing flow controlled automatically thus minimizing operator involvement.

The following is a description of a cryogenic fluidized bed system in which subject process can be carried out. Other similar systems, scaled up or down, will also be suitable.

The heart of the fluidized bed system is a fluidized bed containment vessel comprised of two concentric cylinders separated by five inches of perlite insulation throughout the annulus. The internal cylinder is 44 inches deep and 48 inches in diameter. Along the inside of this cylinder are four fifty foot, ⅜ inch outer diameter copper heat transfer coils connected in parallel, each of which occupies an annular region of about four inches thereby leaving a free cross-section of approximately forty inches in the bed. The gas distributor plate, having a screw type design, comprises the base of the internal cylinder and is nine inches above the base of the exterior cylinder. This nine inch high chamber comprises the plenum, which is divided into four equal quadrants, each of which is independently supplied with gas. The containment vessel is equipped with a cover and a purge system in order to prevent moisture from accumulating when the bed is not being fluidized. Liquid nitrogen is supplied from a storage tank and gaseous nitrogen is supplied from another in-house source. Both are conducted to the system through a simple pipe network. During normal operation of the system, liquid nitrogen is transferred from the storage tank through a pneumatic control valve, is mixed with ambient gaseous nitrogen, and then flows into the four heat transfer coils connected in parallel. Heat is transferred from the bed through the coils to the liquid nitrogen, which is consequently vaporized to gaseous nitrogen. The gaseous nitrogen, which is now at about bed temperature, e.g., about minus 120° F. for treating metal parts, then flows out of the coils to the plenum supply line, through an orifice meter, and into the plenum to provide fluidizing flow to the bed. This flow can be selected to provide either continuous or pulsed fluidization.

In subject process, the liquid and gaseous nitrogen are introduced into the coils, which, as noted, are located in the bed, from a point external, but proximate, to the bed. The point is not more than about a foot away from the bed and preferably no more than about six inches away from the bed. A temperature controller senses the bed temperature and, in conjunction with a pressure transducer, opens or closes a pneumatic control valve to modulate the amounts of liquid nitrogen admitted to the system. The pressure at which the flow of ambient gaseous nitrogen is triggered is controlled by pre-setting a gas regulator. A desired bed temperature, e.g., minus 120° F., is selected and the temperature controller and gas regulator are set. At the start of cooldown, the flow will be essentially liquid nitrogen. As the bed approaches minus 120° F., ambient gas is fed into the liquid nitrogen until eventually a steady state is reached where the bed temperature and coil outlet temperature are maintained at about minus 120° F. Thus, between the temperature controller and the gas regulator, the heat load of the bed and any heat leaks are compensated for. It will be understood that the mixture which passes from the coils into the plenum supply line is a mixture of vaporized liquid nitrogen and the nitrogen gas, which was initially at ambient temperature.

The positioning of two or more heat transfer coils, connected in parallel, in the bed provides sufficient heat transfer area to vaporize the cryogen as well as sufficient cross-sectional flow area for low fluid velocities within the coil, which minimizes liquid slugging. A typical coil is a coil of tubing usually wound in a circular fashion. Each circle of tubing may or may not be in contact with the other. The appearance is similar to that of a coiled spring. While the length and diameter of the tubing, and the number of coils is determined by the size of the bed, some guidance for conventional bed sizes can be given, i.e., the length of the tubing in each coil can be in the range of about 10 to about 100 feet, the number of coils can be in the range of about 2 to about 6, and the diameter of the tube, which makes up the coil can be in the range of about 0.25 inch to about 1.0 inch. Although the tubing used in each coil is relatively long, the coiled tube takes up a small amount of space, e.g., a space having a volume in the range of about 12 to about 300 cubic inches, and the coil diameter, in such a case, is in the range of about 6 to about 80 inches. The placement of the coils within the bed is such that all of the bed particles are brought as close to the coils as possible. Dividing the bed into quadrants with one coil for each quadrant is a preferred way of arranging the coils. While other heat transfer devices can be used instead of coiled tubing, such as plate coils, coiled tubing is preferred. The material of choice for the tubing is copper, but other high thermal conductivity materials, such as aluminum, can be used. Typical flow rates for the liquid nitrogen, ambient gas, and mixture of ambient gas and vaporized liquid nitrogen are in the range of about 4 to about 150 standard cubic feet per minute.

It is found that pre-entry mixing of liquid cryogen and ambient gas in combination with the described coils provide rapid cooldown; utilizes all of the available refrigeration of the cryogen not only in the heat transfer step but by providing cool fluidizing gas; prevents a buildup of refrigerative capacity in the coils, which will be manifested by unstable temperature control of the bed; avoids the need for an external heat exchange system, such as coils immersed in cryogen storage dewars, to precool the fluidizing gas; smooths out pressure fluctuations due to erratic vaporization of liquid in the coils; insures the delivery of a relatively constant fluidizing gas temperature to the bed independent of the rates of gas to liquid; and minimizes consumption of expensive liquid cryogen.

While ambient gas can be mixed with liquid cryogen as the bed aproaches steady state operation, the preferred practice is to wait until the bed has cooled down to the desired temperature, i.e., the point at which the bed is ready to enter into steady state operation. Then, the ambient gas is mixed with the liquid cryogen just before the point of entry of the mixture into the coils in the bed. The mixture of gas and vaporized liquid nitrogen is used for fluidizing after it exits the coils. The heat load on the bed is the amount of refrigeration needed to cool the ambient gas from a low temperature to the desired bed temperature. The refrigeration comes from evaporating the liquid cryogen and superheating it to temperature.

Equations which reflect steady state operation are as follows:

1. Let $X$ = fraction of liquid cryogen in total flow of liquid cryogen and ambient gas
   $Y$ = fraction of ambient gas in total flow
   $X + Y$ = total flow = 1
2. The heat balance of the system is:
   refrigeration supplied to coils = refrigeration used to cool ambient gas
   $XA = B$
   wherein:
   $A$ = change in temperature (°F.) of liquid nitrogen in coils
   $B$ = change in temperature (°F.) of liquid nitrogen/ambient gas mixture prior to entry into coils
3. $$X = \frac{C - D}{\frac{E}{F} + C} + 320° \text{ F.}$$

wherein:
$C$ = initial temperature of ambient gas (°F.)
$D$ = desired bed temperature (°F.)
$E$ = latent heat of vaporization of liquid nitrogen (BTU's per pound)
$F$ = specific heat of gaseous nitrogen (BTU's per pound per °F.)

We claim:
1. In a process for cooling and fluidizing a bed of particles by passing a cryogen through the bed, said bed being first cooled to a desired operating temperature, the improvement comprising:
   (a) admixing a liquid cryogen and an inert gas, said gas being at ambient temperature, at a point external, but proximate, to the bed to provide a mixture of liquid cryogen and gas at a temperature sufficiently low to maintain the bed at about the desired operating temperature;
   (b) introducing the mixture from step (a) into at least two heat transfer coils connected in parallel and located in the bed whereby the desired operating temperature is imparted to the bed, and the liquid cryogen in the mixture vaporizes; and
   (c) removing the mixture of vaporized liquid cryogen and gas formed in step (b) from the coils and introducing the mixture into the bed to fluidize the bed.
2. The process defined in claim 1 wherein 3 to 6 heat transfer coils are used.

* * * * *